United States Patent
Smith et al.

[11] Patent Number: 6,163,359
[45] Date of Patent: *Dec. 19, 2000

[54] LIQUID CRYSTAL DISPLAY AND BACKLIGHT HEATER

[75] Inventors: Bradley Scott Smith; Ben G. Macomber, both of Shoreline; Kent Wilson Davis, Bothell, all of Wash.

[73] Assignee: Intermec IP Corp., Woodland Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/203,964

[22] Filed: Dec. 2, 1998

[51] Int. Cl.$^7$ ...................... G02F 1/1333; G02F 1/1335; G02F 1/1345
[52] U.S. Cl. .............................. 349/161; 349/70; 349/61; 349/64; 349/150
[58] Field of Search .............................. 349/161, 72, 150, 349/61, 64; 313/13, 547, 595; 315/15; 219/485

[56] References Cited

U.S. PATENT DOCUMENTS

| | | | |
|---|---|---|---|
| 4,093,355 | 6/1978 | Kaplit et al. | 350/334 |
| 4,119,842 | 10/1978 | Hayden et al. | 250/201 |
| 4,206,501 | 6/1980 | Brooks | 362/293 |
| 4,643,525 | 2/1987 | Haim | 350/331 |
| 4,723,835 | 2/1988 | Franklin | 350/331 |
| 4,763,992 | 8/1988 | Takada et al. | 350/331 T |
| 4,773,735 | 9/1988 | Ukrainsky et al. | 350/331 T |
| 4,924,215 | 5/1990 | Nelson | 340/701 |
| 5,119,215 | 6/1992 | Marks et al. | 359/44 |
| 5,247,374 | 9/1993 | Terada | 359/44 |
| 5,299,038 | 3/1994 | Hamada et al. | 359/49 |
| 5,523,873 | 6/1996 | Bradford, III et al. | 359/88 |
| 5,710,607 | 1/1998 | Iwamoto et al. | 349/150 |
| 5,742,366 | 4/1998 | Imoto | 349/161 |
| 5,744,819 | 4/1998 | Yamamoto et al. | 257/59 |
| 5,754,262 | 5/1998 | Lengyel | 349/104 |
| 5,757,443 | 5/1998 | Kobayashi | 349/161 |
| 5,767,934 | 6/1998 | Goddard | 349/161 |
| 5,825,394 | 10/1998 | Gilbert et al. | 347/191 |
| 5,835,179 | 11/1998 | Yamanaka | 349/161 |
| 5,875,096 | 2/1999 | Gates | 361/704 |
| 5,879,134 | 3/1999 | Lorimer et al. | 417/53 |

FOREIGN PATENT DOCUMENTS

| | | |
|---|---|---|
| 362008134 | 1/1987 | Japan . |
| 6-235928 | 8/1994 | Japan . |
| 7-130477 | 5/1995 | Japan . |
| 7-321152 | 12/1995 | Japan . |
| 9-127536 | 5/1997 | Japan . |

Primary Examiner—William L. Sikes
Assistant Examiner—Tarifur R. Chowdhury
Attorney, Agent, or Firm—O'Melveny & Myers LLP

[57] ABSTRACT

A heater for a liquid crystal display and accompanying backlight is provided that is easy to install or remove from a liquid crystal display assembly and that extends the low temperature operation of the backlight and the liquid crystal display. The heater comprises a heating element with a foil-type heating element extending from it. The heating element may be attached to an insulating heater pad with a foil backing. The heater is disposed between the backlight diffuser and the printed circuit board and the foil-type heating element wraps around the backlight. Application of an electrical current to the heating element heats the LCD assembly and the backlight and extends their low temperature operation. The heating element may further comprise a resistive element and the light source may further comprise a fluorescent lamp. The foil-type heating element may further comprise an adhesive layer permitting attachment to the backlight.

39 Claims, 2 Drawing Sheets

LIQUID CRYSTAL DISPLAY AND BACKLIGHT HEATER

BACKGROUND OF THE INVENTION

1. Field of the Invention

The present invention relates to heaters, and more particularly, to a heater for a liquid crystal display and backlight.

2. Description of Related Art

A liquid crystal display (LCD) is commonly used in laptop computers and other devices that require a visual output to display information such as automotive and aircraft dashboard displays. A typical LCD comprises a digital display that consists of two sheets of glass separated by a sealed-in, normally transparent, liquid crystal material. The liquid crystals are actually rod-shaped molecules that flow like liquid and bend light. The outer surface of each glass sheet has a transparent conductive coating, such as indium tin oxide, with the viewing-side coating etched into character forming segments that have leads going to the edges of the display. A voltage applied between front and back electrode coatings disrupts the orderly arrangement of the molecules, darkening the liquid enough to form visible characters even though no light is generated.

Reflective screens used in many consumer appliances and some lightweight laptops require external light such as a desk lamp. A LCD that may have to be viewed under both bright lighting conditions and/or in darkness will include a light source, some configurations referred to as a backlight or sidelight, for background lighting of the LCD. Many LCDs will use a translucent reflector with the light behind it, thereby making the background brighter and the characters sharper. This light source must provide a long service life, a high uniform light yield, and emit a constant color over temperature when colored LCDs are used. A fluorescent lamp is an example of a light source that generally meets these requirements. However, a disadvantage of fluorescent lamps is that their illumination level is a function of temperature. A fluorescent lamp usually provides the maximum light yield at ambient temperatures of approximately 40° to 50° C. In the case of low ambient temperatures, such as below 10° C., fluorescent lamps often fail to provide adequate lighting.

To overcome the shortcomings of fluorescent lamps at low temperatures, incandescent light sources may also be provided for lighting the LCD. An incandescent lamp extends the low temperature operation of the LCD, for example to minus 50° C. The incandescent lamp may also serve as a heat source for the fluorescent lamp, thereby raising its operating temperature to a more efficient level for light output. Unfortunately, incandescent lamps provide only a low level of light in comparison with fluorescent lamps and, due to their predominantly point-source nature, provide non-uniform illumination as well as heat.

Other methods have been devised to extend the low temperature operation of the fluorescent lamp. For example, one method is to coat the lamp with a temperature-controlled foil-type heating element. Another method is to provide the lamp with a higher voltage during low temperature operation in order to obtain a higher level of light output. Both of these methods have drawbacks, as the foil-type heating element fails to provide adequate heat for the LCD display, as discussed below, and the operation of the lamp at a higher voltage reduces the life of the lamp.

The functioning of the LCD is also temperature dependent. A twisted nematic, for example, is a type of liquid crystal used in LCDs that are often installed in vehicle dash displays. The twisted nematic LCD consists of a matrix array of liquid crystal picture elements and typically a corresponding backlight for illuminating the elements. When the driving voltages are applied across the liquid crystal material, the twisted nematic liquid crystals tend to align themselves to provide a desired image to the viewer. Below a predetermined temperature, however, the twisted nematic liquid crystal material does not behave in a desired manner. Therefore, the liquid crystal material must be heated to a sufficient temperature, usually above minus 10° C., in order to achieve satisfactory performance.

Furthermore, if the LCD is exposed to drastic changes in atmospheric conditions, such as on a fork lift transitioning from a warm ambient temperature to a commercial freezer storage unit, condensation rapidly forms on the inside of the LCD panel due to vaporized water droplets in the ambient air within the LCD. This significantly degrades the readability of the LCD. Thus, a heater for the LCD is generally used to heat the liquid crystal material to a sufficient temperature and also to reduce the amount of condensation within the LCD.

LCD heaters, such as a conductive indium tin oxide (ITO) coating deposited on a transparent glass substrate or rear polarizer, are well known in the art. The ITO coating is typically energized by way of a pair of parallel buss bars aligned along a planar surface of the ITO with the buss bars being made of either silk-screened conductive epoxy or deposited metal. However, these methods of forming the buss bars have a number of disadvantages. For example, silk-screened conductive epoxy buss bars exhibit less than desirable conductance and this increases the required time period for warming up the corresponding display. Deposition of the metal onto the ITO layer is difficult, expensive, time consuming, and can result in a burned out buss bar or thick electrical connections that are stress concentrators when sandwiched between the plates. It is also difficult and time consuming to attach a conductive wire to the buss bar. In addition, if the ITO layer is scratched, the entire LCD cell must immediately be replaced. Finally, the entire process of providing an ITO layer along with buss bars is difficult and time consuming and is not easily applied to an off-the-shelf LCD module requiring a heater.

Alternatives to the LCD are available. An example would be the electroluminescent display that provides adequate performance down to temperatures as low as minus 30° C. However, this type of display is much more costly than the typical LCD, and is therefore undesirable for many applications.

Accordingly, it would be desirable to provide a heater for the LCD and backlight that is inexpensive and easy to install or remove as part of an LCD assembly, in an existing off-the-shelf LCD, or even for LCDs that are currently installed in devices. The heater would thus extend the low temperature operation of the backlight as well as the LCD and its accompanying electronics, help to remove condensation that may form on or within the LCD display, and extend bulb life by reducing the low temperature operating time.

SUMMARY OF THE INVENTION

In accordance with the teachings of the present invention, a LCD and backlight heater is provided that can be easily assembled as part of an LCD or that can be installed in an existing off-the-shelf LCD. The heater extends the low temperature operation of the LCD and accompanying electronics as well as the backlight and helps to remove condensation that may form on or within the LCD display.

In an embodiment of the present invention, a LCD assembly comprises a LCD for displaying information, a printed circuit board assembly spaced from the LCD, and a backlight diffuser with a light source disposed between the LCD and the printed circuit board assembly. A heating element is disposed between the backlight diffuser and the printed circuit board assembly to heat the LCD assembly. The heating element has a foil-type heating element extending therefrom to conduct heat to the light source. Application of an electrical current to the heating element heats the LCD assembly and extends its low temperature operation. The heating element may be attached to a heater pad having a foil backing. The light source may comprise a fluorescent lamp and the heating element may comprise a resistive element. The foil-type heating element may have an adhesive layer permitting attachment to the light source.

In another embodiment of the present invention, a LCD assembly comprises a LCD for displaying information, a printed circuit board assembly spaced from the LCD, and a heating element disposed between the printed circuit board assembly and the LCD. The heating element permits easy installation and removal from the LCD assembly.

A more complete understanding of the heater for the LCD and backlight will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

Figure 1:
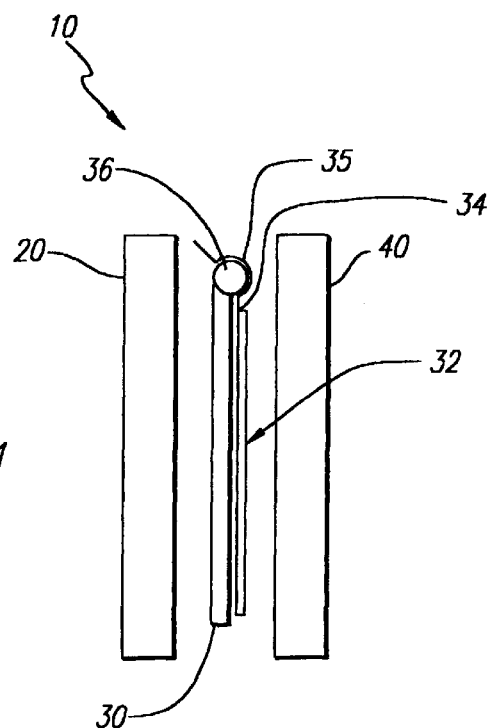
FIG. 1 is a side perspective view of a LCD with a heater for the LCD and backlight in accordance with an embodiment of the present invention.

The present invention satisfies the critical need for an inexpensive heater, for a LCD and a backlight, that is easy to assemble as part of a LCD module, easily installed in an existing off-the-shelf LCD, or allows easy field installation or replacement in a device utilizing a LCD. The heater extends the low temperature operation of the LCD, its accompanying electronics, and the backlight. Furthermore, the heater will help to defrost the LCD display, extend the backlight bulb life, and allow customization for various applications. In the detailed description that follows, like reference numerals are used to describe like elements in one or more of the figures.

Referring first to FIG. 1, a side profile of a typical LCD assembly 10 is shown. The LCD assembly 10 consists of a LCD display 20, a backlight diffuser 30 with a backlight 36, and a printed circuit board 40. A heater 32 for the LCD display 20 and backlight 36 is also shown in FIG. 1. The heater 32 includes a foil 34 that provides at least a partial backing for the heater 32 and also may wrap partially around the backlight 36. The heater pad 32 is shown installed between the backlight diffuser 30 and the printed circuit board 40.

Figure 2:
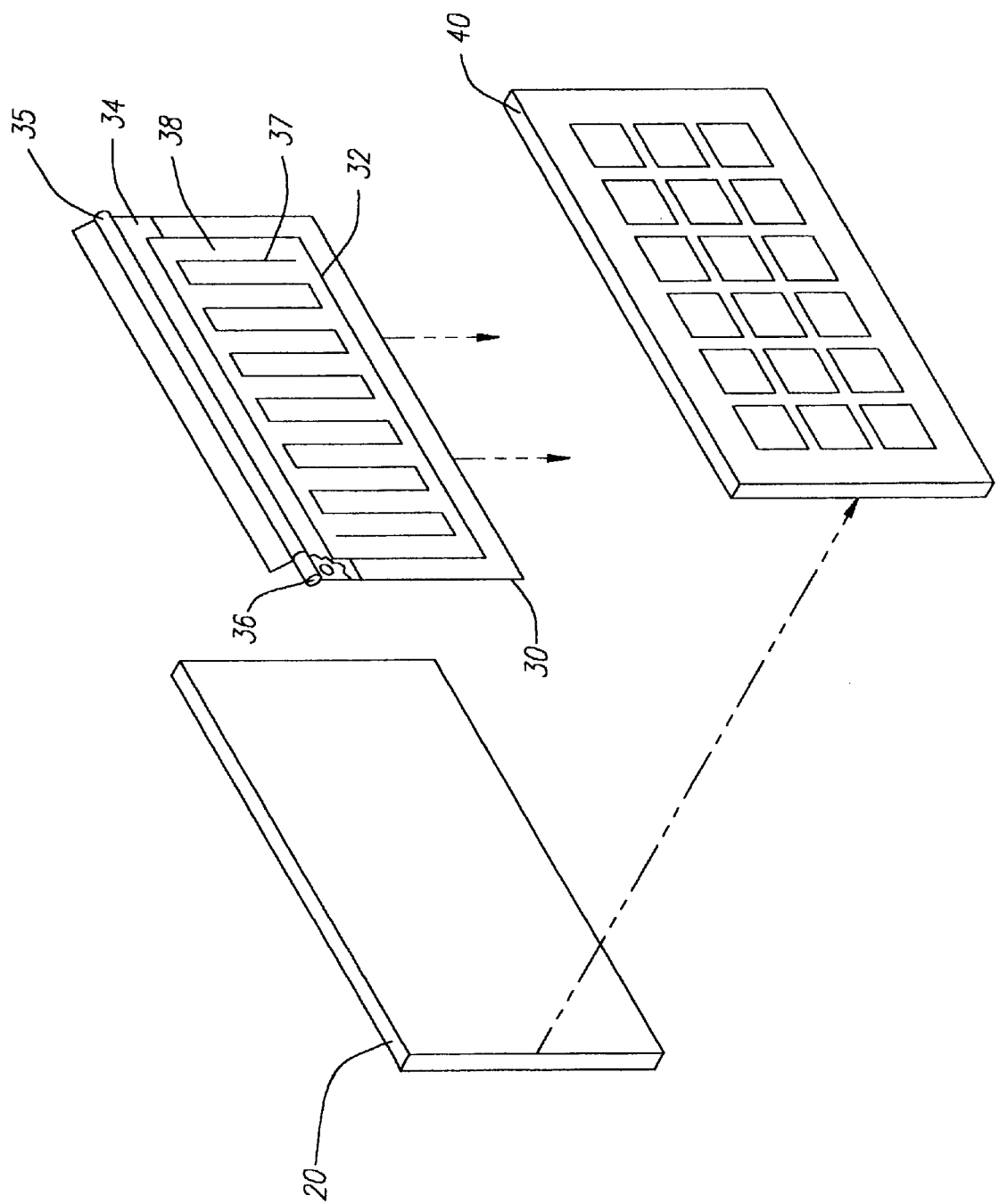
FIG. 2 is an exploded view of FIG. 1, highlighting the heater for the LCD and backlight.

The heater 32 is better illustrated in FIG. 2. FIG. 2 is an exploded perspective view of the LCD assembly 10. As can be seen, the heater 32 comprises a heater pad 38 that can be dimensioned to fully cover the viewable area of the LCD display 20 when it is installed behind the backlight diffuser 30. The heater pad 38 includes a heating element 37 that generates heat upon application of a voltage source (not shown). The heating element 37 may be comprised of a resistive wire or etched foil. The heater pad 38 may be comprised of an insulating material such as polyester or Kapton type material, as known in the art.

The foil 34 may provide the heater pad 38 with either a partial foil backing, as shown, or a full foil backing that would extend over the entire surface of, and may be bonded to, the heater pad 38. The foil 34 provides assistance in the even distribution of heat across the LCD display 20 and to conduct heat to the backlight 36. The foil 34 has tabs 35 that have a weak adhesive backing which holds the foil 34 to the backlight 36. It is anticipated that the adhesive will be selected to allow for the removal of the foil 34 along with the tabs 35 and the heater pad 38 for repairs or servicing of the LCD assembly 10 or the heater 32. The foil 34 and the tabs 35 may be comprised of a laminated foil made of a soft copper.

The innovative design of the LCD and backlight heater allows easy installation of the heater into an off-the-shelf LCD assembly. As can be seen in FIG. 2, the LCD assembly 10 can be partially disassembled so that the backlight diffuser 30 may be removed from between the LCD display 20 and the printed circuit board 40. The heater pad 38 is then placed on the backlight diffuser 30 along with the foil 34 with the tabs 35. The tabs 35 are then adhered to the backlight 36. The backlight diffuser 30, now with the heater 32 attached, is then reinstalled into the LCD assembly 10. This places the heater pad 38 between the backlight diffuser 30 and the printed circuit board 40.

The heater 32 may be utilized in numerous applications due to the ease of assembly. The heater 32 may be part of a LCD assembly or inserted in an existing off-the-shelf LCD module. Furthermore, the ease of installation allows field servicing or replacement of the heater 32.

Figure 3:
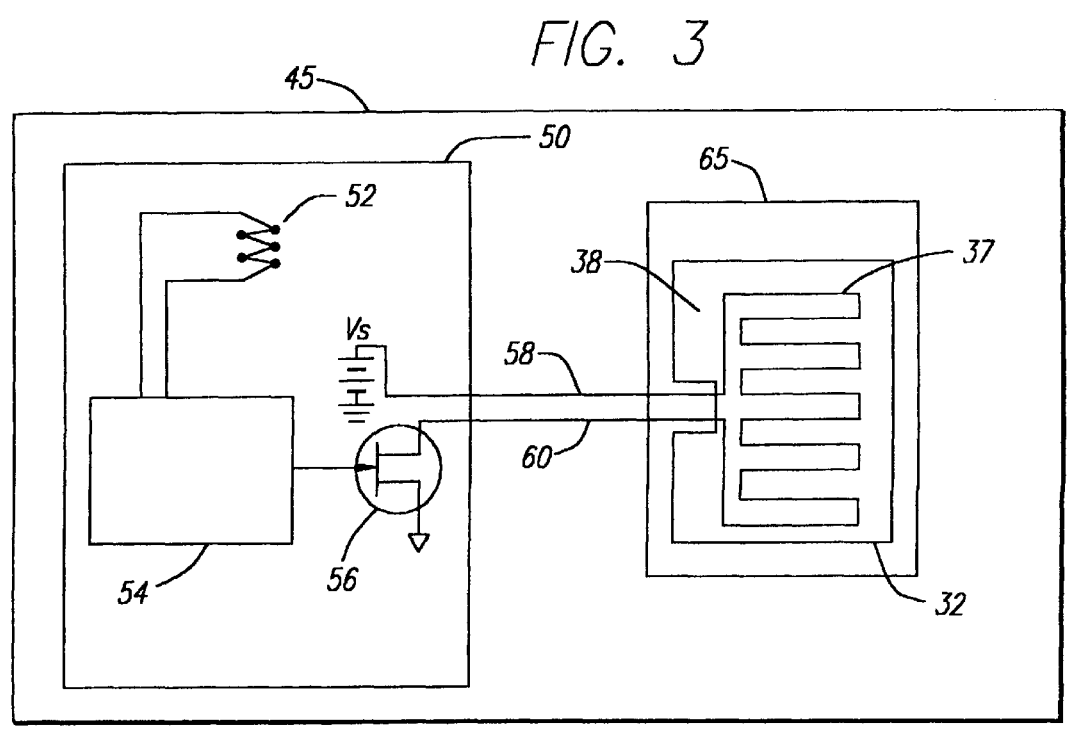
FIG. 3 is a simplified electrical schematic for a heater in accordance with an embodiment of the present invention.

FIG. 3 illustrates a simplified electrical schematic for a heater in accordance with an embodiment of the present invention. A temperature sensor 52 is connected to a microcontroller 54 that controls a heater switch 56. The temperature sensor 52 along with the microcontroller 54 and the heater switch 56 are located on a printed circuit board 50 and are within an enclosure 45 that includes a LCD assembly 65. The LCD assembly 65 includes the heater 32 that comprises the heating element 37 and the heater pad 38.

The heater 32 is controlled by the microcontroller 54 that operates the heater switch 56. A voltage source ($V_s$) is electrically connected by a conductor 58 to the heating element 37. The current flow is controlled by the heater switch 56 connected to a conductor 60 that provides the electrical return path for the voltage source ($V_s$). The heater switch 56 may be comprised of a field effect transistor (FET) and the voltage source ($V_s$) may be a 12 volt direct current (DC) source. The microcontroller 54 processes the data from the temperature sensor 52 and turns the heater 32 on and off with the heater switch 56 based on programmed temperature thresholds.

Application of an electrical current to the heating element 37 causes it to increase in temperature and warm the inner surface of the LCD assembly 65. Because the temperature sensor 52 is located within the enclosure 45 that includes the LCD assembly 65, the temperature sensor 52 is able to accurately track the temperature of the LCD assembly 65. The heater 32 may be provided with the foil 34 that provides a full backing to the heater pad 38 to assist in the conduction of heat to the LCD display 20 and the backlight 36. The heater pad 38 effectively provides heat across the entire inner surface of the LCD display 20 as well as providing heat for the electronics on the printed circuit board 40 and the backlight 36. This effectively extends the low temperature operation of the LCD assembly 10 to approximately minus 30° C. Furthermore, by heating the inner surface of the LCD display 20 to a temperature that is approximately the same as the ambient air within the LCD assembly 10, vaporized water droplets within the ambient air will not condense on the inner surface of the LCD display 20. Therefore, fogging of the LCD display 20 will be significantly reduced.

It should be understood that the simplified electrical schematic for a heater, as described above for FIG. 3, is simply one of many applications for an embodiment of the present invention. For example, the temperature sensor 52 could be located directly on the LCD assembly 65 to monitor the temperature. The heater switch 56 was comprised of a FET, but numerous alternatives such as a relay, etc., may be utilized. Also, instead of the microcontroller 54, simpler temperature monitoring circuits could be used such as a bimetal switch, as utilized in home thermostats, or positive temperature coefficient thermistors.

The operation of the heater 32 and various methods for providing a power source for the heating element 37 should be apparent to those skilled in the art. For the example described in FIG. 3, the heater 32 was designed to produce 12 watts at +12 volts DC. The voltage source ($V_s$) and the resistance of the heating element 37 may be varied to achieve various heat outputs depending on the environment and the particular LCD. Furthermore, additional wattage density may be provided to various areas of the heater 32 depending on the particular LCD assembly's requirements. For example, if a LCD assembly includes a backlight, additional heat may be provided at the side of the heater pad 38 near the backlight to increase heat transfer to the foil 34 with the tabs 35.

It should be apparent that a heater in accordance with an embodiment of the present invention may be customized for various types of LCD designs and shapes along with their unique heating requirements. The environment that the LCD will operate in may also need to be taken into account in order to advantageously utilize an embodiment of the present invention.

Having thus described a preferred embodiment of the LCD and backlight heater, it should be apparent to those skilled in the art that certain advantages of the within system have been achieved. It should also be appreciated that various modifications, adaptations, and alternative embodiments thereof may be made within the scope and spirit of the present invention. For example, a LCD and backlight heater has been illustrated to show an embodiment of the present invention, but it should be apparent that the inventive concepts described above would be equally applicable to a heater solely for a LCD without a backlight, as known in the art. The invention is further defined by the following claims.

What is claimed is:

1. A liquid crystal display assembly, comprising:
    a liquid crystal display;
    a printed circuit board assembly spaced from said liquid crystal display, said printed circuit board assembly electrically connected to said liquid crystal display;
    a backlight diffuser disposed between said liquid crystal display and said printed circuit board assembly, said backlight diffuser having a light source located on at least one side of said backlight diffuser, said light source illuminating said liquid crystal display; and
    a removable heating element disposed between said backlight diffuser and said printed circuit board assembly, said heating element heating said liquid crystal display through said backlight diffuser, said heating element having a foil-type heating element extending therefrom, said foil-type heating element conducting heat to said light source.

2. The liquid crystal display assembly of claim 1, wherein said light source comprises a fluorescent lamp.

3. The liquid crystal display assembly of claim 1, wherein said heating element further comprises a heater pad attached to said heating element.

4. The liquid crystal display assembly of claim 3, wherein said heating pad further comprises a foil backing.

5. The liquid crystal display assembly of claim 4, wherein said foil backing is comprised of copper.

6. The liquid crystal display assembly of claim 3, wherein said heater pad is comprised of a polyester insulating material.

7. The liquid crystal display assembly of claim 3, wherein said heater pad is comprised of a Kapton material.

8. The liquid crystal display assembly of claim 1, wherein said foil-type heating element is comprised of copper.

9. The liquid crystal display assembly of claim 1, wherein said heating element further comprises a resistive element.

10. The liquid crystal display assembly of claim 1, further comprising a voltage source coupled to said heating element.

11. The liquid crystal display assembly of claim 1, wherein said heating element precludes condensation from forming on an inner surface of said liquid crystal display.

12. A liquid crystal display assembly, comprising:
    a liquid crystal display;
    a printed circuit board assembly spaced from said liquid crystal display, said printed circuit board assembly electrically connected to said liquid crystal display;
    a backlight diffuser disposed between said liquid crystal display and said printed circuit board assembly, said backlight diffuser having a light source located on at least one side of said backlight diffuser, said light source illuminating said liquid crystal display; and
    a heating element disposed between said backlight diffuser and said printed circuit board assembly, said heating element heating said liquid crystal display through said backlight diffuser, said heating element having a foil-type heating element extending therefrom, said foil-type heating element conducting heat to said light source;
    wherein said foil-type heating element further comprises an adhesive layer, said adhesive layer bonding said foil-type heating element to said light source.

13. A liquid crystal display assembly, comprising:
    a liquid crystal display;
    a printed circuit board assembly spaced from said liquid crystal display;
    a backlight diffuser disposed between said liquid crystal display and said printed circuit board assembly, said backlight diffuser having a light source for providing light to said liquid crystal display; and
    means for heating said liquid crystal display and said light source, said heater means including a removable heating element disposed between said backlight diffuser and said printed circuit board assembly.

14. The liquid crystal display assembly of claim 13, wherein said heater means further comprises a heater pad attached to said heating element.

15. The liquid crystal display assembly of claim 14, wherein said heater pad is comprised of insulating material.

16. The liquid crystal display assembly of claim 13, wherein said heating element is comprised of a resistive element.

17. The liquid crystal display assembly of claim 13, wherein said light source is comprised of a fluorescent lamp.

18. The liquid crystal display assembly of claim 13, further comprising a voltage source coupled to said heating element.

19. A liquid crystal display assembly, comprising:
a liquid crystal display;
a printed circuit board assembly spaced from said liquid crystal display;
a light source interposed between said liquid crystal display and said printed circuit board assembly, and
a heating element disposed between said printed circuit board assembly and said liquid crystal display, said heating element heating said liquid crystal display assembly and said light source, whereby said heating element having an adhesive layer in direct contact with said light source to thereby provide easy installation and removal from said liquid crystal display assembly.

20. The liquid crystal display assembly of claim 19, wherein said heating element further comprises a heater pad attached to said heating element.

21. The liquid crystal display assembly of claim 20, wherein said heater pad further comprises a foil backing.

22. The liquid crystal display assembly of claim 21, wherein said foil backing is comprised of copper.

23. The liquid crystal display assembly of claim 20, wherein said heater pad is comprised of a Kapton type material.

24. The liquid crystal display assembly of claim 19, wherein said heating element is comprised of a resistive element.

25. The liquid crystal display assembly of claim 19, further comprising a voltage source coupled to said heating element.

26. The liquid crystal display assembly of claim 25, further comprising:
a microcontroller;
a temperature sensor electrically connected to said microcontroller; and
said microcontroller connected to means for switching voltage source on and off.

27. The liquid crystal display assembly of claim 19, further comprising a backlight diffuser, said backlight diffuser disposed between said liquid crystal display and said heating element, said light source being attached to said backlight diffuser.

28. The liquid crystal display assembly of claim 27, wherein said heating element extends adjacent to said light source, said heating element heating said light source.

29. The liquid crystal display assembly of claim 27, wherein said light source comprises a fluorescent lamp.

30. A liquid crystal display assembly, comprising:
a liquid crystal display;
a printed circuit board assembly spaced from said liquid crystal display;
a heating element disposed between said printed circuit board assembly and said liquid crystal display, said heating element heating said liquid crystal display assembly, whereby said heating element provides easy installation and removal from said liquid crystal display assembly; and
a backlight diffuser disposed between said liquid crystal display and said heating element, said backlight diffuser having a light source attached to said backlight diffuser, wherein said heating element extends adjacent to said light source, said heating element heating said light source, said heating element further comprising means for attaching to said light source, wherein said attaching means comprises an adhesive backing.

31. A liquid crystal display assembly, comprising:
a liquid crystal display;
a printed circuit board assembly spaced from said liquid crystal display;
a backlight diffuser disposed between said liquid crystal display and said printed circuit board assembly, said backlight diffuser having a light source for providing light to said liquid crystal display; and
means for heating said liquid crystal display, said heater means including a heating element disposed between said backlight diffuser and said printed circuit board assembly, said heating element further heating said light source, wherein said heater means further comprises a heater pad attached to said heating element, and wherein said heater pad further comprises a foil backing, said foil backing extending from said heater pad and wrapping partially around said light source.

32. The liquid crystal display assembly of claim 31, wherein said foil backing further comprises an adhesive to fasten said foil backing to said light source.

33. The liquid crystal display assembly of claim 31, wherein said foil backing is comprised of copper.

34. A heating system for use in a liquid crystal display assembly comprising a liquid crystal display, a light source, and a backlight diffuser coupled to said light source and adapted to diffuse light from said light source to illuminate evenly said liquid crystal display, said heater system comprising:
a heater pad having a resistive heating element disposed in a foil backing layer, said backing layer further comprising an adhesive layer, said adhesive layer being adapted for bonding said foil backing layer to said backlight diffuser and to said light source, said resistive heating element thereby providing heat to said liquid crystal display through said backlight diffuser and to said light source;
whereby, upon installation of said heater pad in a liquid crystal display assembly, operation of said heater pad precludes condensation of the liquid crystal display and maintains proper operating temperature of said light source.

35. The heating system of claim 34, wherein said foil backing is comprised of copper.

36. The heating system of claim 34, wherein said resistive heating element is comprised of copper.

37. The heating system of claim 34, wherein said heater pad further comprises polyester insulating material.

38. The heating system of claim 34, wherein said heater pad further comprises Kapton material.

39. The heating system of claim 34, wherein said heater pad further comprises means for controlling temperature of said resistive heating element.

* * * * *